United States Patent Office 3,179,619
Patented Apr. 20, 1965

3,179,619
LOW SWELL, HIGH TEMPERATURE ORGANOSILOXANE RUBBERS CONTAINING SILICON-BONDED FLUORINATED ALIPHATIC RADICALS
Eric D. Brown, Midland, Mich., assignor to Dow Corning Corporation, Midland, Mich., a corporation of Michigan
No Drawing. Filed June 27, 1956, Ser. No. 594,113
10 Claims. (Cl. 260—37)

This invention relates to organosiloxane rubbers in which the siloxane polymer contains fluorinated aliphatic radicals attached to the silicon.

One of the difficulties which has been encountered with heretofore commercially available organosiloxane rubbers has been the relatively high swell of these rubbers when subjected to lubricating oils, fuel oils and oils employed in hydraulic systems. As a result of this high swell the heretofore known organosilicon rubbers have been unsatisfactory for some commercial applications.

There have been past attempts to rectify this situation by increasing the degree of cross linking in the siloxane rubbers and/or by increasing the filler loading with relatively dense fillers such as diatomaceous earth. Both of these expedients lowers the swell of the rubber but only at the sacrifice of other physical properties such as tensile and elongation. Furthermore even though the swell is lowered under these conditions it is still too high for many uses. Other attempts to solve this problem have been made by introducing fluorinated cyclobutyl groups and fluorinated tolyl groups into the siloxane rubber. Whereas this results in some decrease in the swell, the resulting rubbers have inferior alkali resistance and/or inferior thermal stability to the presently commercially available siloxane elastomers.

It is the primary object of this invention to provide novel organosilicon elastomers which provide a minimum swell when in contact with automotive fuels, lubricating oils and the like without sacrificing any of the desirable properties of the presently known commercial organosilicon elastomers. Another object is to provide these elastomers at a cost which is economically feasible. Other objects and advantages will be apparent from the following description.

This invention relates to organopolysiloxane elastomers having tensile strenghs of at least 500 p.s.i. and elongations at break of at least 100%, which elastomers comprise (1) a polysiloxane in which essentially all the siloxane units are of the formula $$\text{RCH}_2\text{CH}_2\overset{\text{Me}}{\underset{}{\text{SiO}}}$$

where R is a perfluoroalkyl radical of from 1 to 10 inclusive carbon atoms, said polysiloxane containing up to 10 mol percent copolymerized siloxane units of the formula R'$_2$SiO where R' is selected from the group consisting of methyl, phenyl and vinyl radicals and (2) a filler.

The polysiloxanes which are employed in the elastomers of this invention are in general compositions having a viscosity of at least 1,000,000 cs. and preferably above 10,000,000 cs. The latter materials are in the form of gums. These polymers can be prepared by polymerizing cyclic organosiloxanes of the unit formula

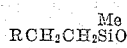
$$(\text{RCH}_2\text{CH}_2\text{SiO})_3$$

These cyclotrisiloxanes are readily polymerized to suitable polymers for making the elastomers of this invention. The best method of doing this is described in the copending application of Oscar K. Johannson, Serial No. 594,107, now abandoned, filed simultaneously herewith. The preparation of cyclic trisiloxanes is described in the copending application of Ogden R. Pierce and George W. Holbrook, Serial No. 594,108, now U.S. Patent No. 2,979,519, also filed concurrently herewith. Both of these copending applications are hereby made a part of this specification by reference.

In general, the polymerization of the cyclic trisiloxanes is best carried out in the presence of an alkaline catalyst such as alkali metal hydroxides or the siloxane salts of alkali metal hydroxides at temperatures ranging from 50 to 150° C.

If desired, the siloxanes employed in this invention can be copolymers of the above-defined fluorinated siloxanes with up to 10 mol percent methyl, phenyl or vinylsiloxanes. These copolymers can be prepared by the alkaline copolymerization of cyclics of the formula (R'$_2$SiO)$_3$ and

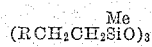
(RCH$_2$CH$_2$SiO)$_3$ as shown in the aforesaid Johannson application. The introduction of small amounts of the methyl and phenyl siloxanes lowers the brittle point of the resulting rubbers. The use of limited amounts of vinyl containing siloxane units gives elastomers of superior compression set. If, however, the amount of non-fluorinated siloxane is increased above 10 mol percent, inferior swell resistance results.

Specific examples of polysiloxanes which are operative in this invention are homopolymers of

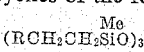
$$\text{CF}_3\text{CH}_2\text{CH}_2\overset{\text{Me}}{\underset{}{\text{SiO}}}$$

$$\text{C}_2\text{F}_5\text{CH}_2\text{CH}_2\overset{\text{Me}}{\underset{}{\text{SiO}}}$$

$$\text{C}_7\text{F}_{15}\text{CH}_2\text{CH}_2\overset{\text{Me}}{\underset{}{\text{SiO}}},$$

and copolymers such as a copolymer of 50 mol percent

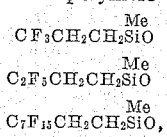
$$\text{CF}_3\text{CH}_2\text{CH}_2\overset{\text{Me}}{\underset{}{\text{SiO}}}$$

and 50 mol percent

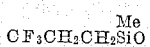
$$\text{C}_2\text{F}_5\text{CH}_2\text{CH}_2\overset{\text{Me}}{\underset{}{\text{SiO}}}$$

a copolymer of 95 mol percent

$$\text{CF}_3\text{CH}_2\text{CH}_2\overset{\text{Me}}{\underset{}{\text{SiO}}}$$

and 5 mol percent diphenylsiloxane, a copolymer of 95 mol percent

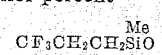
$$\text{CF}_3\text{CH}_2\text{CH}_2\overset{\text{Me}}{\underset{}{\text{SiO}}}$$

4.75 mol percent phenylmethylsiloxane and 0.25 mol percent methylvinylsiloxane and a copolymer of 92 mol percent

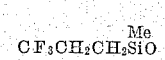
$$\text{C}_2\text{F}_5\text{CH}_2\text{CH}_2\overset{\text{Me}}{\underset{}{\text{SiO}}}$$

and 8 mol percent dimethylsiloxane.

The elastomers of this invention may contain any suitable filler. The preferred fillers are inorganic materials such as metal oxides such as titania, zinc oxide, ferric oxide and the like; siliceous materials such as clay, diatomaceous earth, crushed quartz and silicas such as fume silica, silica aerogels and silica xerogels. If desired, the fillers, particularly the silicas, may be treated with chlorosilanes or in other ways so that the surfaces thereof have organosilyl groups attached to the silicon by SiOSi linkages. For example, the surfaces of the fillers can be modified with trimethylsilyl groups, phenyldimethylsilyl groups, 3,3,3-trifluoropropylmethylsilyl groups and dimethylvinylsilyl groups by the method shown in the copending application of Leslie J. Tyler, Serial Number 160,100, filed May 4, 1950, now U.S. Patent 2,863,846.

The fillers can be employed in any desired amount ranging from 5 parts to over 200 parts per 100 parts of polymer. The precise amount of filler employed in any case will vary with the type of filler and the properties desired in the finished elastomer.

The elastomers of this invention can be vulcanized by any of the known methods for vulcanizing organosiloxane elastomers. One of the preferred methods comprises heating the compounded elastomer with an organic peroxide such as benzoyl peroxide, tertiary-butyl perbenzoate, dicumyl peroxide, chlorobenzoyl peroxides, and tertiary-butyl peracetate. Preferably these peroxides are employed in amounts from .1 to 10% by weight based on the weight of the polysiloxane.

Alternatively the compositions of this invention may be vulcanized by incorporating therein an alkylpolysilicate such as ethylpolysilicate and a salt of a carboxylic acid such as lead naphthenate or dibutyltindiacetate. These compositions will vulcanize at room temperature. A second room temperature vulcanizing process is that of incorporating small amounts of a hydrogen containing siloxane such as methylhydrogenpolysiloxane in the composition and then adding the salt of a carboxylic acid such as lead 2-ethylhexoate. When this method is employed, the base polymer should contain silicon bonded hydroxyl groups.

If desired, the compositions of this invention can also contain further additives such as compression set additives, pigments, oxidation inhibitors and other materials commonly employed in organosiloxane rubbers.

The unique feature of the novel elastomers of this invention is a combination of high physical strength, low swell in organic solvents and excellent temperature stability. The elastomers of this invention are flexible at temperatures even lower than dimethylpolysiloxane elastomers. At the same time they have a thermal stability comparable to the dimethylpolysiloxane elastomers. The stress-strain properties of the siloxanes of this invention vary depending upon the type and amount of filler employed. The highest stress-strain properties are obtained employing extremely finely divided silicas such as fume silicas and silica aerogels. When these materials are employed the tensile strength will range upwards of 1,000 p.s.i. and elongation upwards of 500%.

It has been found that the elastomers of this invention will swell less than 20% when subjected to hydrocarbon fuels such as isooctane and toluene and less than 10% when subjected to diester oils and to lubricating oils. It has been found that the resistance of the rubber to solvents is not dependent upon the degree of cross linking. Consequently it is possible to obtain low swell rubbers without sacrificing the elongation of the elastomer.

The elastomers of this invention are particularly useful for the preparation of hoses, seals, linings for fuel tanks and for electrical insulation which is subjected to fuels, lubricating oils and hydraulic fluids.

The following examples are illustrative only and should not be construed as limiting the invention which is properly delineated in the appended claims.

*Example 1*

100 parts by weight of a polysiloxane gum having a Williams plasticity of 40 mils and having the unit formula $$CF_3CH_2CH_2\overset{Me}{Si}O$$

were milled with 30 parts by weight of a fume silica and 2 parts by weight benzoyl peroxide until a uniform mix was obtained. The resulting product was cured on the following schedule: 10 minutes at 125° C., 24 hours at 150° C. and 24 hours at 200° C. The stress-strain properties following each of these cures is shown below.

| Cure | Durometer | Tensile strength in p.s.i. | Percent elongation at break | Percent tension set |
|---|---|---|---|---|
| 10 min. at 125° C | 51 | 706 | 400 | 8 |
| 24 hrs. at 150° C | 64 | 889 | 300 | 10 |
| 24 hrs. at 200° C | 64 | 685 | 290 | 8 |

The elastomer which had been cured 24 hours at 200° C. was immersed in the following fluids under the following conditions and the percent swell was measured. The results obtained under identical conditions with a typical dimethylpolysiloxane elastomer is shown for comparison.

| Fluid | Conditions | Percent swell | Percent swell dimethylpolysiloxane |
|---|---|---|---|
| A mixture of 70% by volume isooctane and 30% by volume toluene. | 24 hrs. at 25° C | 19 | 200 |
| ASTM Oil No. 3 | 24 hrs. at 150° C | 3 | 40 |
| A diester oil | 24 hrs. at 200° C | 10 | 45 |

*Example 2*

The formulation of Example 1 was repeated except that 1.5 parts of benzoyl peroxide were employed as the vulcanizing agent. After equivalent cures the elastomer had equivalent swells in the above type fluids. The stress-strain properties of this elastomer were as follows:

| Cure | Durometer | Tensile strength in p.s.i. | Percent elongation at break |
|---|---|---|---|
| 10 min. at 125° C | 43 | 1,000 | 610 |
| 24 hrs. at 150° C | 65 | 1,230 | 540 |
| 24 hrs. at 200° C | 67 | 1,080 | 490 |

*Example 3*

When a copolymeric siloxane having a composition of 95 mol percent $$C_2F_5CH_2CH_2\overset{Me}{Si}O$$

4.75 diphenylsiloxane and .25 mol percent methylvinylsiloxane, said copolymer having hydroxyl groups on the end of the chains and having a viscosity of 2,000,000 cs. is mixed with 50 parts by weight of a silica xerogel having trimethylsiloxy groups on the surface thereof, 1 part by weight of methylhydrogen-polysiloxane and 0.1 part by weight of lead 2-ethylhexoate and allowed to stand at room temperature, a high strength polysiloxane rubber is obtained which shows low swell when subjected to the fluids of Example 1.

*Example 4*

When 100 parts of a polysiloxane gum having the unit formula $$C_7F_{15}CH_2CH_2\overset{Me}{Si}O$$

is milled with 30 parts of a fume silica and 1.5 parts of t-butyl perbenzoate and thereafter cured 15 minutes at 150° C. followed by 24 hours at 200° C., a high strength elastomer having a swell equivalent to the elastomer of Example 1 is obtained.

That which is claimed is:

1. A siloxane elastomer having a tensile strength of at least 500 p.s.i. and an elongation at break of at least 100% which comprises (1) a polysiloxane in which essentially all of the units have the formula $$RCH_2CH_2\overset{Me}{Si}O$$

where R is a perfluoroalykyl radical of from 1 to 10 inclusive carbon atoms, said siloxane containing up to 10 mol percent copolymerized siloxane units of the formula R'$_2$SiO where R' is selected from the group consisting of methyl, phenyl and vinyl radicals and (2) a filler.

2. A vulcanizable composition of matter comprising (1) a polysiloxane in which essentially all of the units are of the formula $$RCH_2CH_2\overset{Me}{Si}O$$

where R is a perfluoroalkyl radical of from 1 to 10 inclusive carbon atoms, said siloxane containing up to 10 mol percent copolymerized siloxane units of the formula R′$_2$SiO where R′ is selected from the group consisting of methyl, phenyl and vinyl radicals, (2) a filler and (3) from .1 to 10 percent by weight based on the weight of the siloxane of an organic peroxide.

3. A siloxane elastomer having a tensile strength of at least 500 p.s.i. and an elongation at break of at least 100% which comprises (1) a homopolymeric siloxane in which the units are of the formula $$\text{RCH}_2\text{CH}_2\overset{\text{Me}}{\text{SiO}}$$

where R is a perfluoroalkyl radical of from 1 to 10 inclusive carbon atoms, and (2) a silica filler.

4. A vulcanizable composition of matter comprising a mixture of (1) a homopolymeric siloxane in which the units are of the formula $$\text{RCH}_2\text{CH}_2\overset{\text{Me}}{\text{SiO}}$$

where R is a perfluoroalkyl radical of from 1 to 10 inclusive carbon atoms, (2) a silica filler, and (3) from 0.1 to 10% by weight based on the weight of the siloxane of an organic peroxide vulcanizing agent for organosiloxanes.

$$\text{CF}_3\text{CH}_2\text{CH}_2\overset{\text{Me}}{\text{SiO}}$$

5. A siloxane elastomer having a tensile strength of at least 500 p.s.i. and an elongation at break of at least 100% which consists essentially of (1) a homopolymeric siloxane in which the units are of the formula $$\text{CF}_3\text{CH}_2\text{CH}_2\overset{\text{Me}}{\text{SiO}}$$

and (2) a silica filler.

6. A vulcanizable composition of matter consisting essentially of a mixture of (1) a homopolymeric siloxane having a viscosity of at least 1,000,000 cs. and in which the units are of the formula $$\text{CF}_3\text{CH}_2\text{CH}_2\overset{\text{Me}}{\text{SiO}}$$

(2) a filler, and (3) from 0.1 to 10% by weight based on the weight of the siloxane of an organic peroxide vulcanizing agent for organosiloxanes.

7. A siloxane elastomer having a tensile strength of at least 500 p.s.i. and an elongation at break of at least 100% which comprises (1) a copolymeric siloxane in which up to 10 mol percent of the units are of the formula R′$_2$SiO where each R′ is selected from the group consisting of methyl, phenyl and vinyl radicals, the remaining units being of the formula $$\text{RCH}_2\text{CH}_2\overset{\text{Me}}{\text{SiO}}$$

where R is a perfluoroalkyl radical of from 1 to 10 inclusive carbon atoms, and (2) a silica filler.

8. A vulcanizable composition of matter comprising a mixture of (1) a copolymeric siloxane in which up to 10 mol percent of the units are of the formula R′$_2$SiO where each R′ is selected from the group consisting of methyl, phenyl and vinyl radicals, the remaining units being of the formula $$\text{RCH}_2\text{CH}_2\overset{\text{Me}}{\text{SiO}}$$

where R is a perfluoroalkyl radical of from 1 to 10 inclusive carbon atoms, (2) a silica filler, and (3) from 0.1 to 10% by weight based on the weight of the siloxane of an organic peroxide vulcanizing agent for organosiloxanes.

9. A siloxane elastomer having a tensile strength of at least 500 p.s.i. and elongation at break of at least 100% which consists essentially of (1) a copolymeric siloxane in which up to 10 mol percent of the polymeric units are of the formula R′$_2$SiO where each R′ is selected from the group consisting of methyl, phenyl and vinyl radicals, the remaining units being of the formula $$\text{CF}_3\text{CH}_2\text{CH}_2\overset{\text{Me}}{\text{SiO}}$$

and (2) a silica filler.

10. A vulcanizable composition of matter consisting essentially of a mixture of (1) a copolymeric siloxane having a viscosity of at least 1,000,000 cs. and in which up to 10 mol percent of the polymeric units are of the formula R′$_2$SiO where each R′ is selected from the group consisting of methyl, phenyl and vinyl radicals, the remaining units being of the formula $$\text{CF}_3\text{CH}_2\text{CH}_2\overset{\text{Me}}{\text{SiO}}$$

(2) a silica filler, and (3) from 0.1 to 10% by weight based on the weight of the siloxane of an organic peroxide vulcanizing agent for organosiloxanes.

References Cited by the Examiner

UNITED STATES PATENTS

| | | | |
|---|---|---|---|
| 2,460,795 | 2/49 | Warrick | 260—46.5 |
| 2,486,162 | 10/49 | Hyde | 260—46.5 |
| 2,637,738 | 5/53 | Wagner | 260—46.5 |
| 2,651,651 | 9/53 | Simons et al. | 260—46.5 |
| 2,686,194 | 8/54 | Passino | 260—46.5 |
| 2,692,844 | 10/54 | Hyde | 260—46.5 |

OTHER REFERENCES

Clark, Jr., WADC Tech. 54–213, July 1954, pages 1–19.

Whitmore: Organic Chemistry, 2nd Ed., 1951, pages 46–49, 104, 115, 123, 132, 136, 150, 194–198, 204, 212, 220, 244 and 246.

Morton: The Chemistry of Heterocyclic Compounds (1946), pages 84–91 and 96.

Tarrant: WADC Technical Report 55–220, August 1955, pages 3, 37 and 38.

Pierce et al.: J.A.C.S., vol. 75, No. 22, November 1953, pages 5618–5620.

McBee et al.: J.A.C.S., vol. 77, No. 5, March 1955, pages 1292–1293.

MURRAY TILLMAN, *Primary Examiner.*

P. E. MANGAN, MILTON STERMAN, H. N. BURSTEIN, *Examiner.*